(12) United States Patent
Kollep (10) Patent No.: US 9,974,412 B2
(45) Date of Patent: May 22, 2018

(54) BEVERAGE PRODUCTION DEVICE WITH ENHANCED RECEPTACLE INJECTION MEANS

(71) Applicant: Nestec S.A., Vevey (CH)

(72) Inventor: Alexandre Kollep, Lutry (CH)

(73) Assignee: Nestec S. A., Vevey (CH)

( * ) Notice: Subject to any disclaimer, the term of this patent is extended or adjusted under 35 U.S.C. 154(b) by 91 days.

(21) Appl. No.: 14/650,518

(22) PCT Filed: Dec. 5, 2013

(86) PCT No.: PCT/EP2013/075642
§ 371 (c)(1),
(2) Date: Jun. 8, 2015

(87) PCT Pub. No.: WO2014/086915
PCT Pub. Date: Jun. 12, 2014

(65) Prior Publication Data
US 2015/0320256 A1    Nov. 12, 2015

(30) Foreign Application Priority Data

Dec. 7, 2012  (EP) ..................................... 12196148

(51) Int. Cl.
*A47J 31/46*         (2006.01)
*A23F 3/18*          (2006.01)
(Continued)

(52) U.S. Cl.
CPC ............. *A47J 31/4403* (2013.01); *A23F 3/18* (2013.01); *A23F 5/262* (2013.01); *A47J 31/46* (2013.01)

(58) Field of Classification Search
CPC ......... A47J 31/4403; A47J 31/46; A23F 3/18; A23F 5/262
(Continued)

(56) References Cited

U.S. PATENT DOCUMENTS 4,653,390 A * 3/1987 Hayes ..................... A47J 31/56
                                                  392/442
5,302,407 A * 4/1994 Vetterli ................... A47J 31/46
                                                  426/433
(Continued)

FOREIGN PATENT DOCUMENTS

CH           702947 A2    10/2011
CN         101252860 A     8/2008
(Continued)

OTHER PUBLICATIONS

International Search Report, dated Apr. 3, 2014, in PCT/EP2013/075642, filed Dec. 5, 2013.
(Continued)

*Primary Examiner* — David Angwin
*Assistant Examiner* — Justin Dodson
(74) *Attorney, Agent, or Firm* — Dunlap Codding, P.C.

(57) ABSTRACT

A device for preparing a liquid comestible is disclosed. The device may include a beverage preparation means for supply of a beverage and/or a brewing unit designed for receiving an ingredient-containing capsule and preparing the beverage from the ingredients by means of injection of hot pressurized liquid into the capsule. The device may further include a receptacle support means designed to support and to selectively connect to a receptacle for receiving the resulting beverage, beverage delivery means adapted to collect and/or guide the resulting beverage from the beverage preparation means/brewing unit to the receptacle support means, and/or injection means adapted to selectively open a portion of an outer wall of the receptacle connected to the receptacle support means and to establish a fluid communication between the beverage delivery means and the receptacle.

11 Claims, 4 Drawing Sheets

(51) Int. Cl.
*A23F 5/26* (2006.01)
*A47J 31/44* (2006.01)

(58) Field of Classification Search
USPC ......... 99/295, 300, 304, 305, 307, 310, 314,
99/315; 426/433, 435
See application file for complete search history.

(56) References Cited

U.S. PATENT DOCUMENTS

| | | |
|---|---|---|
| 2006/0207432 A1 | 9/2006 | Van Der Meer |
| 2008/0142421 A1* | 6/2008 | Windmiller .............. B65D 1/06 210/137 |
| 2008/0277020 A1 | 11/2008 | Windmiller |
| 2009/0199518 A1* | 8/2009 | Deuber ................ A47J 31/3628 53/492 |
| 2010/0043911 A1* | 2/2010 | Russell .............. A47G 19/2205 141/1 |

FOREIGN PATENT DOCUMENTS

| | | |
|---|---|---|
| CN | 101394768 A | 3/2009 |
| CN | 101500458 A | 8/2009 |
| CN | 101528099 A | 9/2009 |
| CN | 102802475 A | 11/2012 |
| CN | 202525938 U | 11/2012 |
| DE | 102008007254 A1 | 8/2008 |
| DE | 102009048233 A1 | 4/2010 |
| EP | 1658796 A2 | 5/2006 |
| EP | 2335529 A1 | 6/2011 |
| EP | 2468154 A1 | 6/2012 |
| WO | WO 2007102139 A1 * | 9/2007 ......... A47G 19/2205 |

OTHER PUBLICATIONS

Written Opinion of the International Search Report, dated Apr. 3, 2014, in PCT/EP2013/075642, filed Dec. 5, 2013.
EP13799581.7; Alexandre Kollep, Office Action dated Aug. 4, 2016.
CN 2013800723964; Nestec S.A. Office Action and Search Report dated Feb. 22, 2017; 11 pages.
CN 2013800723964; English Translation of Office Action and Search Report; dated Feb. 22, 2017; 14 pages.

* cited by examiner

BEVERAGE PRODUCTION DEVICE WITH ENHANCED RECEPTACLE INJECTION MEANS

CROSS REFERENCE TO RELATED APPLICATIONS/INCORPORATION BY REFERENCE STATEMENT

This application is a US national stage application filed under 35 USC § 371 of International Application No. PCT/EP2013/075642, filed Dec. 5, 2013; which claims benefit of EP Application No. 12196148.6, filed Dec. 7, 2012. The entire contents of the above-referenced applications are hereby expressly incorporated herein by reference.

FIELD OF THE INVENTIVE CONCEPT(S)

The presently disclosed and/or claimed inventive concept(s) relates to a device for preparing a single-component and/or multi-component beverage from a food ingredient provided to the device within a capsule. More particularly, the presently disclosed and/or claimed inventive concept(s) relates to such a device comprising means for providing the resulting beverage through an outer wall portion of a dedicated receptacle.

BACKGROUND

In the field of beverage production devices, a multitude of various systems and devices exist which enable a consumer to prepare a desired beverage such as e.g. a coffee, coffee-type beverage or tea beverage.

A very known example is the preparation by means of a capsule-respectively cartridge-based system that enables the interaction of liquid such as e.g. water with ingredients provided within the capsule in order to form a liquid comestible. Thereby, many different types of beverages can be prepared by means of the device such as for example espresso, regular coffee, milk and coffee, milk alone such as e.g. plain or frothed hot milk, cappuccino, tea or other kinds of infusion. However, it may as well be possible to produce other types of liquid comestibles such as e.g. soup with such a device.

In general, the known beverage preparation devices have liquid delivery means such as an outlet spout under which a receptacle is placed in order to receive the beverage prepared by the machine. Thereby, the spout is either movably connected to the device in order to assume positions of different height with respect to a support for the receptacle, or is provided at a fixed position relative high with respect to the receptacle support. According to this known arrangement of the outlet spout, a wide range of receptacles can be placed beneath the spout such as smaller espresso cups, as well as relatively large coffee cups or mugs.

These known prior art devices suffer the drawback that the beverage preparation device has to be of a considerable height in order to accommodate a spout and/or support means for receiving a large variety of different receptacles.

In addition, spilling of the prepared beverage may occur, in case the consumer misplaces the receptacle with respect to the outlet spout of the device.

It is therefore desired to provide a beverage preparation device that offers a solution to these problems. In particular, an enhanced concept of beverage delivery by such a device is sought-after, which enables the provision of the resulting beverage into a receptacle from a position at or close to the bottom of the receptacle.

EP 1 991 094 situated on the field of beer beverages relates to a drinking vessel comprising a base and at least one wall, wherein the base and the wall together define a chamber for receiving a beverage. The drinking vessel further comprises a sealable aperture provided in the base for filling the chamber with a beverage. The drinking vessel may be connected to a dispensing apparatus arranged for providing a beverage such as e.g. beer to the sealable aperture in the base of the drinking vessel.

CH 702 947 relates to a beaker comprising a water soluble portion of coffee powder integrated in a blind area, and a beaker base comprising a non-return valve that is centrically inserted on a lower side. The beaker may be arranged on a dedicated apparatus for providing liquid into the beaker through the non-return valve, thus producing a coffee beverage by dissolution of the coffee powder provided in the beaker base.

Based on the known prior art, the presently disclosed and/or claimed inventive concept(s) aims at providing an enhanced beverage production device for supplying a liquid to a dedicated receptacle through an outer wall of the receptacle.

BRIEF DESCRIPTION OF THE DRAWINGS

Further features, advantages and objects of the presently disclosed and/or claimed inventive concept(s) will become apparent for the skilled person when reading the following detailed description of embodiments of the presently disclosed and/or claimed inventive concept(s), when taken in conjunction with the figures of the enclosed drawings.

iii.

DETAILED DESCRIPTION

In a first aspect, the presently disclosed and/or claimed inventive concept(s) relates to a device for preparing a beverage from ingredients contained in a capsule, the device comprising: a brewing unit designed for receiving the capsule and preparing the beverage from the ingredients by means of injection of pressurized liquid into the capsule, receptacle support means designed to support and to selectively connect to a receptacle for receiving the resulting beverage, beverage delivery means adapted to collect and/or guide the resulting beverage from the brewing unit to the receptacle support means, and injection means adapted to selectively open a portion of an outer wall of the receptacle connected to the receptacle support means and to establish a fluid communication between the beverage delivery means and the receptacle.

The device according to the presently disclosed and/or claimed inventive concept(s) enables the preparation and supply of beverage to a receptacle, whereby filling of the receptacle with the beverage is obtained through an outer wall of the receptacle. Accordingly, spilling during provision of the beverage from the device to the receptacle is prevented.

In a particular non-limiting embodiment, the beverage is filled into the receptacle through an outer wall portion adjacent to or at the bottom portion of the receptacle, which portion rests on the receptacles support means of the device. Thereby, the receptacle (in a particular, non-limiting embodiment) comprises inlet means such as a valve or selectively openable aperture that is integrally formed in the outer wall of the receptacle.

The inlet means of the receptacle are (in a particular, non-limiting embodiment) provided at the bottom portion or adjacent to the bottom portion of the receptacle. Accordingly, the inlet means may also be provided in a lateral side wall of the receptacle at a position which is (in a particular, non-limiting embodiment) closed to respectively adjacent the bottom portion of the receptacle.

The inlet means may for example be a valve or a self-closing membrane. The closing strength of the valve or the membrane is (in a particular, non-limiting embodiment) selected to ensure that it can withstand at least the pressure exerted on it by liquid in the receptacle when the particular receptacle is filled completely without any leakage.

The brewing unit of the device (in a particular, non-limiting embodiment) comprises at least one enclosing member designed for being transferred between an open insertion position for inserting the capsule and a closed injection position for enclosing the capsule within the brewing unit.

The enclosing member may be an essentially bell-shaped member having an inner surface that is complementary shaped to the outer surface of the capsule to be used in conjunction with the device.

On a side of the brewing unit essentially opposite to the enclosing member, the brewing unit (in a particular, non-limiting embodiment) comprises a support plate against which an outlet face of the capsule abuts in a closed injection position of the brewing unit respectively of the enclosing member of the brewing unit.

The support plate (in a particular, non-limiting embodiment) comprises opening means for opening the outlet face of the capsule upon provision of pressurized liquid to the capsule. The opening means may e.g. be protruding pyramidal-shaped perforating members. Between the opening means of the support plate outlet openings may be present which enable the transport of beverage from one side of the support plate facing the capsule to the respective other side thereof.

The support plate is (in a particular, non-limiting embodiment) arranged essentially vertical within the beverage production device.

The brewing unit of the device is (in a particular, non-limiting embodiment) designed to accommodate a rotational-symmetric capsule comprising a truncated-cone shaped body portion and a membrane connected to a circumferential rim portion of the body portion and constituting an outlet face thereof.

A suitable capsule to be used with the device according to the presently disclosed and/or claimed inventive concept(s) is described in EP1654966.

The brewing unit may further comprise an ejection mechanism designed to eject the capsule from the brewing unit after the beverage preparation. Thereby, the brewing unit may be designed to eject the capsule into a dedicated waste container or tray of the device.

The beverage preparation device (in a particular, non-limiting embodiment) comprises a liquid respectively a water reservoir and heating means such as e.g. a thermoblock for providing heated or hot liquid to the beverage preparation means respectively the brewing unit of the device.

In a particular, non-limiting embodiment, the device further comprises a pump that is connected to the brewing unit and/or the beverage delivery means of the device.

The pump is (in a particular, non-limiting embodiment) designed for providing pressurized liquid to the brewing unit. Thereby, the pump is (in a particular, non-limiting embodiment) designed for providing pressurized liquid between 10 and 25 bar, such as but not limited to, between 14 and 20 bar, to the interior of the capsule provided to the brewing unit.

The pump is further designed to be able to transport the resulting beverage through the beverage delivery means to the receptacle support means and thus, into the receptacle when a fluid connection is established by means of the injection means opening a portion of the outer wall of the receptacle.

Further, the pump is (in a particular, non-limiting embodiment) designed to provide a pressure sufficient to overcome the pressure acting onto the beverage delivery means and/or the inlet aperture of the receptacle from the beverage already present within the receptacle. The provided pressure thus is sufficient to open the inlet means of the receptacle and/or provide respectively inject the beverage to the receptacle connected to the beverage delivery means of the device.

The pump may as well be designed to adapt the provided pressure dependent on the state of the beverage preparation process. For example, during the liquid being injected in a capsule a first pressure is provided by the pump, whereby for the transportation of the resulting beverage drained from the capsule at least a second amount of pressure may be provided by the pump. Further, the pump may as well be designed to adapt the pressure exerted onto the provided liquid during the process of liquid being injected into the provided capsule.

The receptacle support means of the device (in a particular, non-limiting embodiment) comprise locking means for selectively connecting a receptacle to the receptacle support of the device. Thereby, the locking means may connect to or interact with dedicated connection means arranged at the receptacle. The connection means of the receptacle is (in a particular, non-limiting embodiment) a circular stepped recess to which a moving latch or hook member of the receptacle support means may be selectively connected.

The receptacle support means (in a particular, non-limiting embodiment) comprises a base portion with an upper surface on which the bottom portion of the receptacle is arranged when being associated with the device. At the base portion and more particularly (but not by way of limitation), at the centre of the receptacle support means, an aperture is (in a particular, non-limiting embodiment) provided which connects to the beverage delivery means of the device. The aperture may optionally be surrounded by a sealing member such as a gasket for sealing the aperture when a receptacle is connected to the receptacle support means.

The beverage delivery means are connected to the brewing unit and the receptacle support means such that a fluid communication is established between these parts of the device. The beverage delivery means may comprise flexible and/or rigid tubular members.

The beverage delivery means (in a particular, non-limiting embodiment) comprise a flexible tube portion connected to the outlet of the brewing unit. Further, the beverage delivery means (in a particular, non-limiting embodiment) comprise a rigid tubular portion that is connected to the outlet aperture at the receptacle support means. The rigid tubular portion of the delivery means is (in a particular, non-limiting embodiment) arranged essentially vertically within the device. Accordingly, the rigid tubular portion is designed to guide the resulting beverage within the device in an essentially vertical direction towards the receptacle support means.

The injection means of the device are (in a particular, non-limiting embodiment) arranged within the base portion of the receptacle support means. The injection means is (in a particular, non-limiting embodiment) an essentially vertically moveable member designed to selectively connect to or interact with an inlet or valve means of the receptacle provided in an outer wall thereof.

The injection means are (in a particular, non-limiting embodiment) designed to be selectively moveable from a first closed or retracted position to a second open or protruding injection position. In the open or protruding injection position, the injection means establish a fluid communication between the beverage delivery means and the receptacle.

The injection means are (in a particular, non-limiting embodiment) connected to a motor or driving means which are designed for mechanically driving the injection means.

The injection means may as well be automatically activated by providing a pressurized liquid to the interior of the beverage delivery means of the device.

The injection means may be supported within or may be connected to a tubular member of the beverage delivery means that is arranged essentially vertically within the device.

In its open or protruding injection position, a fluid communication is established such that beverage prepared and drained from the capsule provided to the device is transported via the beverage delivery means into the receptacle connected to the device.

In a particular, non-limiting embodiment, the injection means protrude in its protruding injection position essentially vertically from a base portion of the receptacle support means. Thereby, the injection means (in a particular, non-limiting embodiment) protrude in a direction essentially parallel with a central axis of the provided receptacle and/or the base portion of the receptacle support means.

The device according to the presently disclosed and/or claimed inventive concept(s) may be integrated in a top surface of a counter, kitchen worktop or any other suitable furniture. Thereby, the brewing unit of the device is (in a particular, non-limiting embodiment) accessible from above. Thus, an insertion aperture of the brewing unit may be arranged to correspond to an aperture provided in a top surface of such a counter, kitchen worktop or furniture. According to such an embodiment, the receptacle support means may also be integrally formed with the respective top surface.

The receptacle support means of the device are (in a particular, non-limiting embodiment) arranged at a vertical position of the same or greater height than the brewing unit when seen in side view.

In a particular, non-limiting embodiment, the device may further be equipped with emptying means designed for evacuating residual liquid from the device and in particular from the beverage delivery means. A more detailed description of a particular, non-limiting embodiment of such emptying means will be further described below.

It is noted that the device according to the presently disclosed and/or claimed inventive concept(s) is (in a particular, non-limiting embodiment) designed to enable the preparation of a plurality of different types of hot and/or cold liquid comestibles such as e.g. coffee, tea, milk, soup or the like. Thereby, a large variety of beverages may be prepared dependent on the nature of the ingredients enclosed in a dedicated capsule to be associated with the device.

In a further aspect, the presently disclosed and/or claimed inventive concept(s) relates to a method for preparing a beverage from ingredients contained within a capsule, the method comprising the steps of:
 connecting a beverage receptacle to a support portion of a beverage preparation device,
 preparing a beverage by means of injection of pressurized liquid into a capsule,
 supplying the resulting beverage into the receptacle through an outer wall of the receptacle.

During the beverage preparation, the pressure of the pump for provision of liquid into the capsule and thus into the beverage delivery means of the device may vary depending on the roasting and grinding of the coffee in the capsule. Also, the pressure provided by the pump may vary with the amount of fluid provided to the brewing unit and/or the beverage delivery means.

The method (in a particular, non-limiting embodiment) also comprises the step of automatically open an inlet portion within an outer wall of the receptacle. Therefore, dedicated injection means of the device are (in a particular, non-limiting embodiment) brought from a first retracted or closed position to a second extended or open position. The activation of the injection means may be carried out by dedicated drive means or by means of raising the pressure exerted upon the beverage delivery means respectively the injection means via the pump of the device.

The method may also comprise the step of evacuating residual liquid and/or beverage from the beverage delivery means of the device after and/or before the preparation of the beverage by means of injection of liquid into the capsule.

In another aspect, the presently disclosed and/or claimed inventive concept(s) relates to a device for preparing a liquid comestible comprising: a beverage preparation means for preparation or supply of a beverage, receptacle support means designed to support and to selectively connect to a receptacle for receiving the resulting beverage, beverage delivery means adapted to collect and/or guide the resulting beverage from the beverage preparation means to the receptacle support means, a pump connected to the beverage delivery means, and injection means adapted to selectively open a portion of an outer wall of the receptacle connected to the receptacle support means and to establish a fluid communication between the beverage delivery means and the receptacle, wherein the device further comprises emptying means designed for selectively ejecting any residual liquid from the beverage delivery means.

The receptacle support means of the device according to the presently disclosed and/or claimed inventive concept(s) are (in a particular, non-limiting embodiment) arranged at a higher vertical position with respect to the beverage preparation means of the device when seen in side view. In another particular, non-limiting embodiment, the support means may be arranged essentially at the same vertical height with respect to the beverage preparation means of the device.

The beverage preparation means of the device may comprise a brewing unit in which (in a particular, non-limiting embodiment) pressurized liquid is injected into a capsule or cartridge provided to the device as already described.

The beverage preparation means may also be constituted by a brewing device for preparing tea beverages upon injection of liquid such as water at relatively low pressure conditions into the capsule. Thereby, the pressure exerted by the pump onto the liquid respectively beverage present within the capsule and/or the beverage delivery means may be adapted to certain predefined parameters depending on the status of the beverage preparation process.

For example, the pressure acting onto the beverage may be slightly raised after finishing the preparation of the tea beverage from the capsule. Accordingly, the resulting tea beverage may effectively be transported into the receptacle through an inlet opening in the outer wall of the receptacle and thus, fill the receptacle from a portion adjacent to or at the bottom portion thereof.

The beverage preparation means may also be any other suitable beverage supply means such as a beverage tank or supply which is (in a particular, non-limiting embodiment) connected to a delivery pump of the device for providing the beverage to the beverage delivery means and thus, to the inside of a dedicated receptacle.

The emptying means according to the presently disclosed and/or claimed inventive concept(s) are (in a particular, non-limiting embodiment) designed to selectively assume a first beverage delivery position and a second beverage ejection position. Accordingly, at the first beverage delivery position, the entire beverage provided by the beverage preparation means may be effectively guided to the receptacle support means and thus, to the interior of the receptacle. At the beverage ejection position, which is (in a particular, non-limiting embodiment) assumed before and/or after the beverage preparation process, any residual liquid and/or beverage may be ejected respectively drained from the beverage delivery means within the device. Air trapped in the capsule would under the effect of the pressure lead to a spilling of residual liquid towards the cup and thus to a spilling of coffee outside the cup. This is prevented by the emptying of the tube. Moreover, cross-contamination of beverages prepared by the device can be significantly reduced respectively prevented.

The emptying means of the device are (in a particular, non-limiting embodiment) integrally formed with the beverage delivery means.

The emptying means (in a particular, non-limiting embodiment) comprise an outlet aperture or opening which is designed for being selectively closed in a beverage delivery position in which beverage is supplied to the receptacle. Further, the emptying means are (in a particular, non-limiting embodiment) connected to a liquid reservoir or waste container for collecting any residual liquid ejected from the device.

The emptying means (in a particular, non-limiting embodiment) comprise a junction element connecting at least two tube members of the beverage delivery means. Thereby, at least one tube member of the beverage delivery means is (in a particular, non-limiting embodiment) a flexible tube member. The flexible tube member is (in a particular, non-limiting embodiment) arranged to connect an outlet of the beverage preparation means with the emptying means of the device.

At least a portion of the emptying means is (in a particular, non-limiting embodiment) arranged to assume an elevated beverage delivery position and a lowered beverage ejection position.

The evacuation respectively ejection of liquid may be supported by gravity acting onto any residual liquid within the beverage delivery means. Optionally or additionally, the evacuation of the ejection of liquid may as well be supported by purge means blowing air through the beverage delivery means in the beverage ejection position.

The emptying means may also be designed to stretch a flexible tube portion of the beverage delivery means in order to obtain a higher slope of the tube portion within the device. Accordingly, effective evacuation of any remaining liquid within said flexible portion is enabled.

In a further aspect, the presently disclosed and/or claimed inventive concept(s) relates to a method for preparing a beverage comprising the steps of:
  connecting a beverage receptacle to a support portion of a beverage preparation device,
  providing a supply of beverage which is (in a particular, non-limiting embodiment) prepared by injection of liquid into a capsule containing beverage ingredients,
  supplying the beverage into the receptacle by means of beverage delivery means and injection means through a portion of an outer wall of the receptacle, and
  evacuating residual liquid and/or beverage from the beverage delivery means.

In a particular, non-limiting embodiment, the method further comprises the step of moving at least a portion of the beverage delivery means from a first beverage delivery position to a second beverage ejection position of relatively smaller vertical height when seen in sectional side view.

Figure 1:
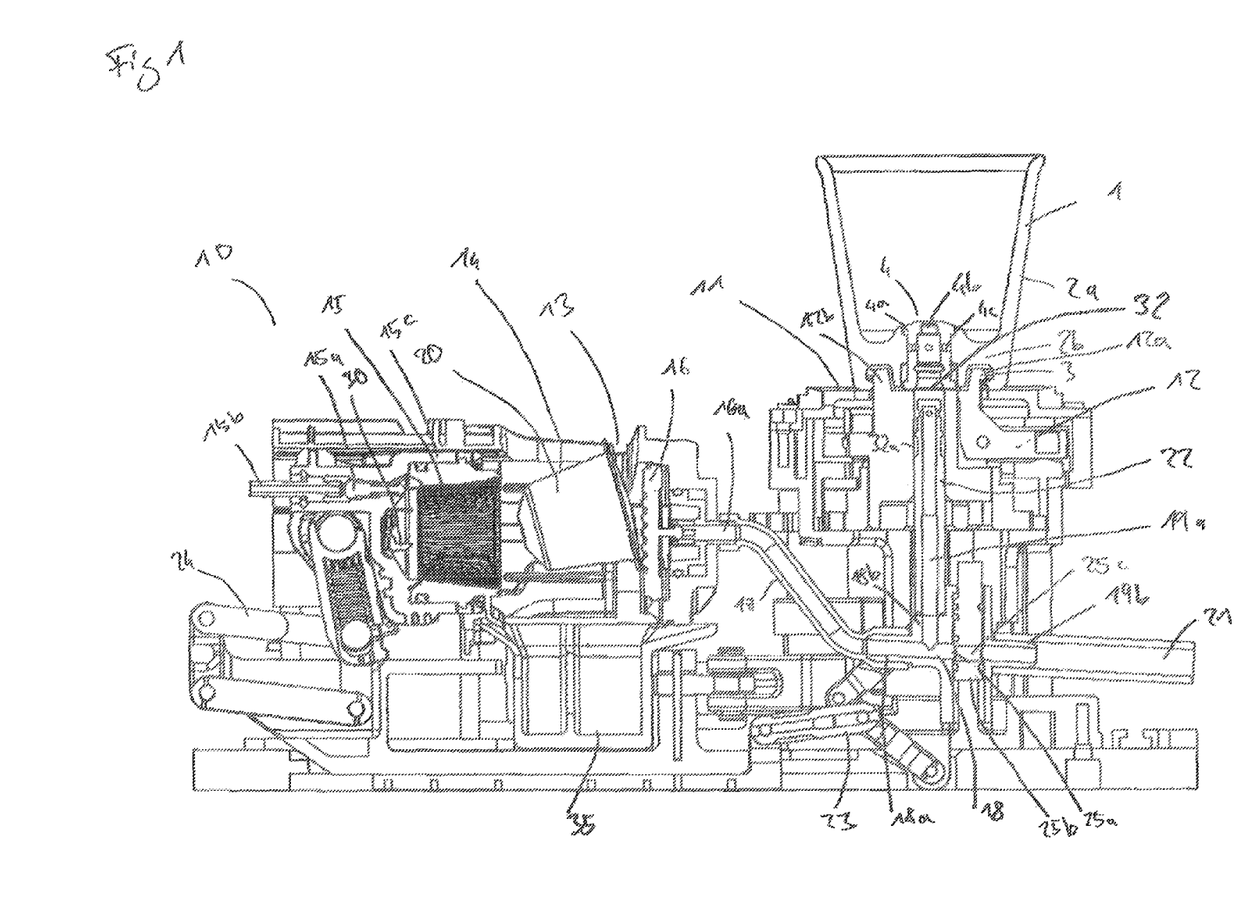
FIG. 1 shows a sectional side view of a particular, non-limiting embodiment of the device according to the presently disclosed and/or claimed inventive concept(s) in a first capsule insertion position.

FIG. 1 is a sectional side view of a particular, non-limiting embodiment of the device 10 according to the presently disclosed and/or claimed inventive concept(s). The device 10 (in a particular, non-limiting embodiment) comprises a beverage brewing unit 14 which is accessible from above by means of an insertion aperture 13. In the shown capsule insertion position of the device, the capsule 20 may thus be provided by a consumer through the aperture 13 into the inside respectively brewing chamber of the beverage brewing unit 14. The brewing unit 14 further comprises an enclosing member 15 which is shown in its open capsule insertion position and which is designed to be transferable into a closed capsule injection position (see FIG. 3).

The enclosing member 15 is (in a particular, non-limiting embodiment) equipped with opening means 30 such as a perforating blade member arranged at an end portion of the enclosing member 15 and designed to perforate an inlet face of the capsule. The enclosing member 15 is further connected to a liquid provision means 15a which are connected to a liquid supply 15b connected to a liquid tank and/or heating means (not shown) such as a thermoblock of the device.

The liquid supply 15b is (in a particular, non-limiting embodiment) connected to a pump (not shown) which is able to provide pressurized liquid to the enclosing member 15.

Figure 3:
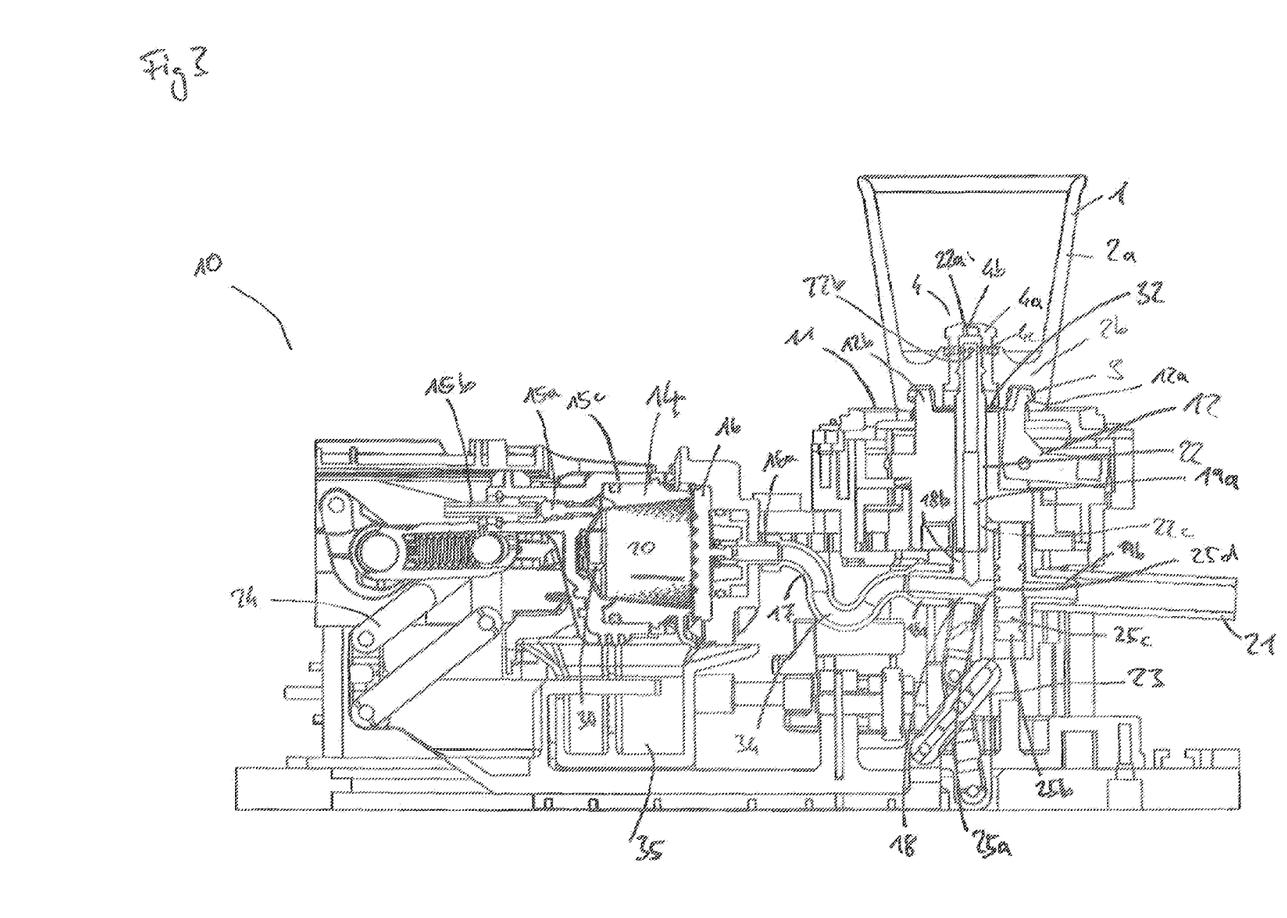
FIG. 3 shows a sectional side view of a particular, non-limiting embodiment of the device according to the presently disclosed and/or claimed inventive concept(s) in a second capsule injection position.

The brewing chamber may be selectively covered by a dedicated cover member 15c arranged to close-off the insertion aperture 13 in the beverage injection position (see FIG. 3). In the shown capsule insertion position, the cover member 15c assumes an open position.

The device further comprises driving means 24 for transferring respectively moving the enclosing member 15 in an essentially horizontal direction from the shown capsule insertion position to its beverage injection position as shown in FIG. 3 and in which the capsule 20 is in a sealing engagement between the enclosing member 15 and a support plate 16 arranged on an opposite side of the brewing chamber respectively brewing unit 14.

The capsule when inserted into the brewing unit 14 may be supported within the unit by means of support or guide members (not visible in the drawings) arranged to hold the capsule in an essentially horizontal arrangement between the enclosing member 15 and the support plate 16.

The support plate 16 is (in a particular, non-limiting embodiment) equipped with a plurality of opening means for opening an outlet face of the capsule during liquid injection into the capsule.

The support plate 16 further comprises a beverage outlet 16a connected to a portion of the beverage delivery means 17 which is in fluid communication with the interior of the brewing unit 14.

The device further comprises receptacle support means 11 onto which a consumer may place a dedicated receptacle 1.

The receptacle 1 may be of various sizes and/or geometrical forms. The receptacle comprises an outer wall 2a,2b forming the side and bottom portion of the receptacle. The receptacle is (in a particular, non-limiting embodiment) rotational-symmetric about a central axis.

At the center of the bottom portion 2b, the receptacle comprises an inlet means 4 designed for selectively enable a liquid communication through the outer wall 2b of the receptacle. It is noted that the inlet means 4 may as well be provided eccentric within a bottom portion 2b of the receptacle.

The inlet means 4 (in a particular, non-limiting embodiment) comprise a sealing member 4a which is moveably supported in a (in a particular, non-limiting embodiment) cylindrically shaped bore or aperture within the outer wall 2b. The sealing member 4a comprises an essentially longitudinal recess 4b designed for being engaged by a dedicated injection member 22 of the device 10.

In the lateral sidewall of the sealing member 4a, at least one, more (in a particular, non-limiting embodiment) at least two, even more (in a particular, non-limiting embodiment) a plurality of supply channels 4c is arranged for connecting the outer circumferential surface of the sealing member 4a with the inside of recess 4b. The supply channels 4c are (in a particular, non-limiting embodiment) of reduced diameter with respect to the diameter of the recess 4b within the sealing member 4a. In particular, the supply channels may have a diameter of (in a particular, non-limiting embodiment) between 0.5 and 4 mm, such as but not limited to, between 1 and 2 mm. The recess 4b may have a diameter of between about 1 and 6 mm, such as but not limited to, between 2 and 4 mm.

The sealing member 4a is (in a particular, non-limiting embodiment) fitted within outer wall 2b of the receptacle, whereby in a normal state it assumes a closing position as shown in FIG. 1 and in which no beverage present in the receptacle will drain from the sealing member or inlet 4a. The sealing member respectively inlet means 4a may as well assume an elevated delivery position as shown in FIG. 3 in which fluid communication is established between the interior of the receptacle 1 and the outside thereof.

The receptacle 1 may be made from glass, plastic or metal. The sealing member 4a is (in a particular, non-limiting embodiment) made from silicone, plastic or metal material.

The receptacle support means 11 (in a particular, non-limiting embodiment) comprise a flat upper surface onto which the receptacle 1 may be placed. Thereby, the support means 11 (in a particular, non-limiting embodiment) comprise a protruding annular portion 12b which is shaped such as to be placed within a dedicated recessed portion 3 of the receptacle 1. By means of the annular portion 12b interacting with the complementary shaped circular recess 3 within the receptacle 1, centering of the receptacle 1 with respect to the support means 11 is (in a particular, non-limiting embodiment) obtainable.

At the center of the support means 11, a delivery or outlet aperture 32 is arranged which connects to the beverage delivery means 17,19a of the device.

The delivery or outlet aperture 32 may be surrounded by sealing means which are arranged to seal the outlet during beverage provision to the receptacle 1.

Optionally or in addition, a portion of the bottom outer wall 2b of the receptacle 1 may also be provided with dedicated sealing means.

The receptacle support means 11 further comprises locking means 12a which are (in a particular, non-limiting embodiment) concentric with the annular protruding portion 12b of the support means 11. Thereby, the locking means is (in a particular, non-limiting embodiment) a latch member or a plurality of latch members arranged at the circumference of the annular protruding portion 12b.

Figure 2:
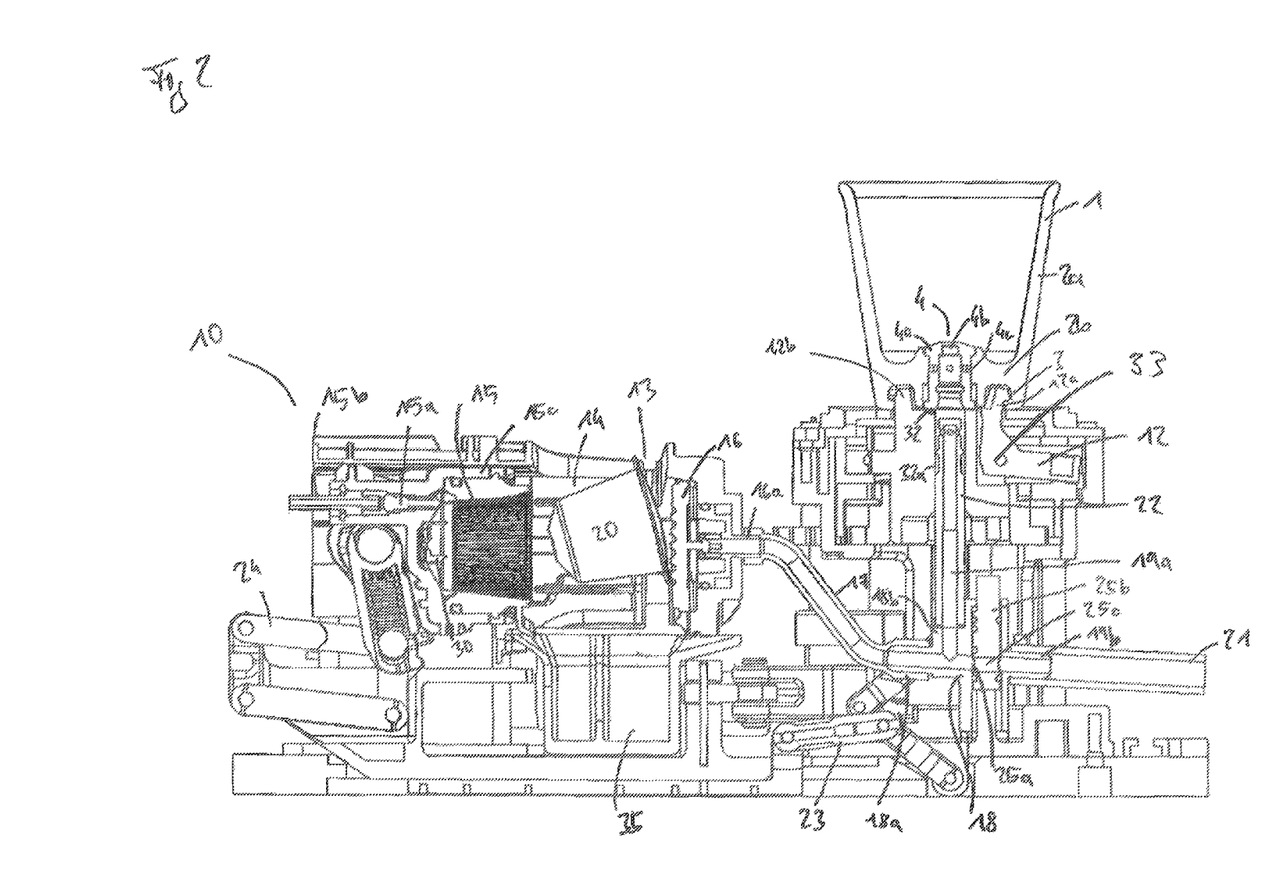
FIG. 2 shows a sectional side view of a particular, non-limiting embodiment of the device according to the presently disclosed and/or claimed inventive concept(s) in a receptacle connection position.

The locking means 12a are (in a particular, non-limiting embodiment) designed to be selectively moveable from a retracted position in which the latch member do not extend from the circumference of the annular portion (see FIG. 1) to a position, in which the locking means 12a do extend from the circumference of the annular portion, thereby interacting with the circular recessed portion 3 provided within the receptacle (see FIG. 2). For this purpose, the recessed portion 3 of the receptacle 1 is (in a particular, non-limiting embodiment) stepped such that the latch member 12a can hook onto the stepped portion in order to prevent any axial and/or rotational movement of the receptacle 1.

The device further comprises beverage delivery means 17,19a connecting the outlet 16a of the brewing unit 14 to the outlet aperture 32 of the receptacle support means 11. The delivery means (in a particular, non-limiting embodiment) comprise at least a flexible tube portion 17. Further, the delivery means comprise tubular member 19a which is arranged (in a particular, non-limiting embodiment) vertically within the device. The tubular member 19a is (in a particular, non-limiting embodiment) arranged concentrically with the outlet aperture 32 provided in the receptacle support means 11.

The beverage delivery means 17,19a of the device are connected to an injection member 22 which is (in a particular, non-limiting embodiment) arranged moveably in an essentially vertical direction within the device. The injection member 22 may be integrally formed with the at least tubular member 19a or may be connected to the tubular member.

The injection member 22 may assume a retracted position as shown in FIG. 1 and in which the injection member 22 does not protrude from the outlet aperture within the receptacle support means 11. The injection member may further assume an extended beverage delivery position in which the injection member 22 protrudes from the outlet aperture 32 of the receptacle support means (see FIG. 3).

The injection member 22 may be moved by a dedicated drive means (not shown) of the device.

The device further comprises residual beverage ejection means 18 which are connected (in a particular, non-limiting embodiment) to both, the tubular member 19a as well as the flexible tube 17. The ejection means 18 is (in a particular, non-limiting embodiment) a junction element that connects a dedicated end portion of the flexible tube 17 as well as the tubular member 19a to an ejection tube 19b,21.

The junction element 18 is (in a particular, non-limiting embodiment) movable within the device by drive means 23. Thereby, the junction element 18 may assume a lowered beverage ejection position as shown in FIG. 1 and an elevated beverage preparation position as shown in FIG. 3.

The junction element is connected with a first inlet 18a to the flexible tube portion 17. A second inlet 18b connects vertically upwards to the tubular member 19a. An outlet 25a connected to both inlets 18a,18b is arranged to selectively connect to an outlet tubing 19b,21. Said outlet 25a thus provides the outlet aperture of the junction element which is designed to be selectively opened or closed. FIG. 1 shows the open position of the outlet 25a in which said outlet is placed in line with a further tube portion 25c of a member 25b connecting the outlet 25a to the outlet tubing 19b,21.

In a particular, non-limiting embodiment as shown, the second inlet 18b also connects to the injection member 22. Thereby, the injection member 22 may be integrally formed with the junction element 18. Accordingly, a movement of the junction element 18 in an upward and downward direction vertically within the device also leads to a corresponding movement of the injection member 22. In such an embodiment, the injection member 22 and the junction element 18 are (in a particular, non-limiting embodiment) guided within a vertical oriented bore 32a of the receptacle support 11. Said bore 32a is (in a particular, non-limiting embodiment) of same diameter as outlet opening 32 provided in the base portion of the receptacle support 11.

Figure 4:
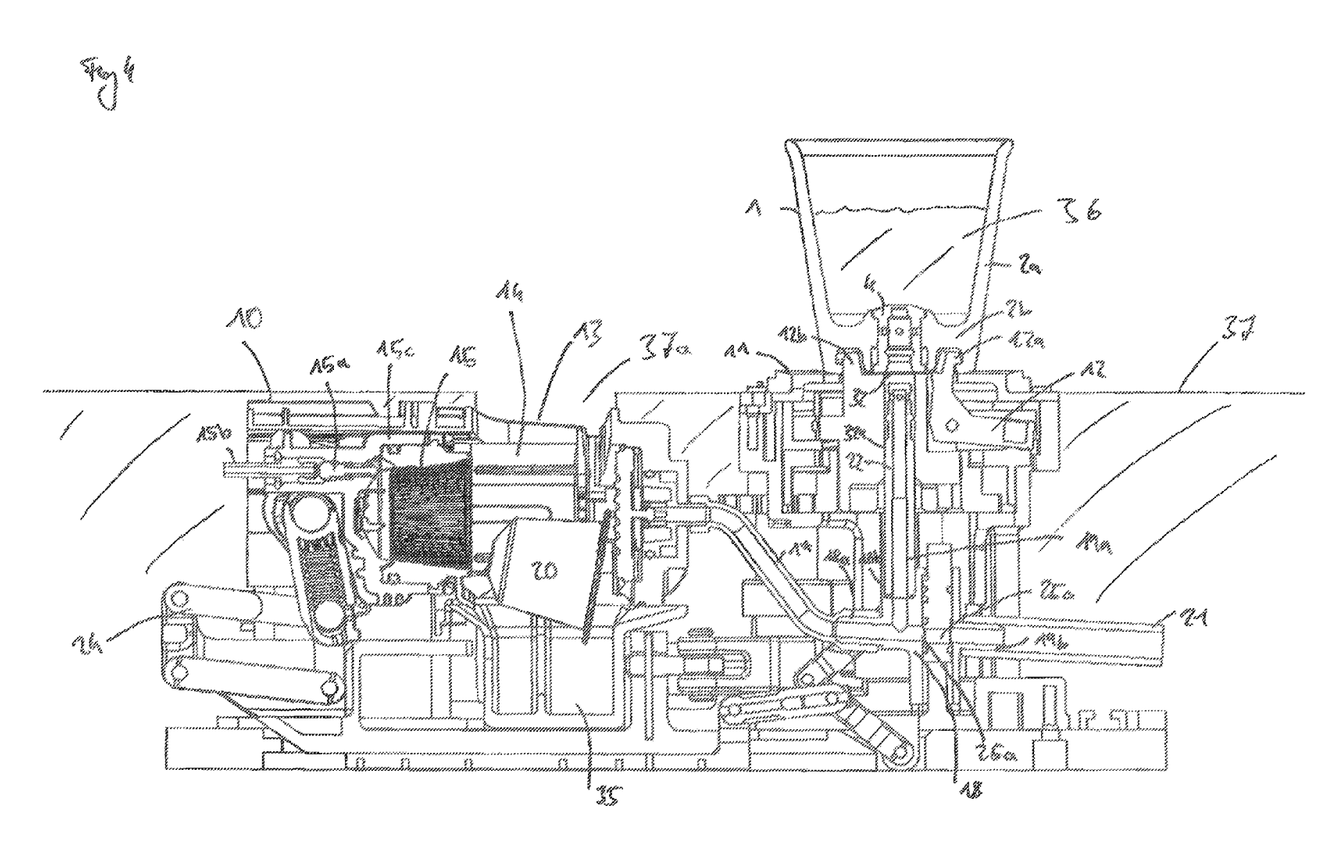
FIG. 4 shows a sectional side view of a particular, non-limiting embodiment of the device according to the presently disclosed and/or claimed inventive concept(s) in a liquid evacuating position.

In the position shown in FIG. 4, the junction element 18 of the ejection means is in its ejection position. Thereby, the injection element 22 is retracted within the outlet opening 32. In this position, the flexible tube 17 arranged between the outlet 16a of the support plate 16 and the ejection means 18 comprises a maximized slope towards the junction element 18 such that any residual liquid present in said tube 17 will be transported gravity-driven to the junction element 18 and thus be ejected from the device via tubular outlets 25c, 19b. The liquid is thus guided to an outlet spout 21 which may guide the liquid to a waste or liquid container.

In this position of the flexible tube 17, the tube may as well be slightly stretched between the rather rigid outlet 16a of the support plate 16 and the junction element 18. Accordingly, the flexible tube 17 is brought into a form in which it is void of any bends or curved portions in which residual liquid may collect.

As the second tubular portion 19a and the injection member 22 are also connected to the junction element 18 and are arranged in a vertical orientation within the device, any residual liquid present therein will also be driven to the junction element 18 and thus to the outlet spout 21 of the ejection means.

FIG. 3 shows the support plate 16 pressing against the housing of the brewing unit 14 allowing the preparation of a beverage. FIG. 4 shows the support plate 14 in a retracted position, allowing liquid trapped between the support plate 16 and tube 17 to evacuate by gravity into the capsule container, and air to enter the tube 17 to allow emptying by gravity in a subsequent step. Hence, ejection of residual liquid within the flexible tube 17 and the tubular portion 19a from the beverage delivery means towards the lowered position of the junction element 18 is obtained.

FIG. 2 relates to the device according to FIG. 1 in which the locking means 12 are activated in order to fixedly connect the receptacle 1 to the receptacle support 11. Thereby, the locking means 12 are rotated about a provided axis 33 such that at least a portion of the protruding annular member 12a is urged outwardly from said member, thereby connecting to a stepped recessed portion 3 of the receptacle 11 as shown in FIG. 2.

FIG. 3 relates to the device according to FIGS. 1 and 2 in which the injection member 22 is brought into its protruding injection position, in which the member 22 protrudes from outlet opening 32 of the receptacle base 11 to a predefined extent. Thereby, an end portion 22a of the member 22 connects to a bottom or stepped portion of recess 4b of the inlet means 4 of the receptacle 1 such that the inlet means 4 are urged upwardly towards the interior of the receptacle 1. Thereby, a fluid connection between the interior of the receptacle 1 and the delivery means 17,19a is obtained as the injection member 22 is equipped with a plurality of outlet opening 22b which are (in a particular, non-limiting embodiment) arranged at the circumference of the injection member 22 and which are at the same level as the inlets or channels 4c provided within the inlet means 4 establishing a fluid connection. Fluid may thus be transported from the tubular member 19a connected to a first end 22c of the injection member 22 opposite to the distal end 22b protruding from the outlet 32.

The injection member 22 is (in a particular, non-limiting embodiment) moved vertically within the outlet channel or bore 32,32a by means of the junction element 18 being moved in the corresponding direction due to drive means 23 coupled thereto. The junction element 18 is thus moved from its lowered ejection position to an elevated injection or fluid delivery position. Thereby, the outlet channel 25a of the junction element 18 is (in a particular, non-limiting embodiment) closed-off. This is (in a particular, non-limiting embodiment) obtained by moving the outlet channel 25a away from its aligned position with tubular member 25c leading to the outlet spout 21. Thereby, the outlet channel 25a is closed-off by means of a lateral wall 25d.

FIG. 3 relates also to the beverage injection position of the brewing unit 4 in which the cover member 15c is arranged to cover the insertion aperture 13 of the brewing unit. In this position, the enclosing member 15 is also brought to fully enclose the capsule 20, thereby piercing the inlet face thereof by means of the provided blade members 30.

In this position, the pump (not shown) of the device (in a particular, non-limiting embodiment) provides pressurized liquid to the interior of the capsule such that the pressure within the capsule rises. This leads to the outlet face of the capsule being urged against the opening means provided at the support plate 16, which will then rupture respectively open said outlet face in case the pressure has reached a certain threshold value. Beverage which is prepared by interaction of liquid with the ingredients provided within the capsule will thus be poured from the capsule towards the plate 16 and consequently into the flexible tubular member 17 of the delivery means. As the outlet opening 25a of the junction element is closed-off, the beverage will travel from the flexible tube 17 to the vertically arranged tubular member 19a and consequently via the injection member 22 into the receptacle 1.

As indicated by reference numeral 34, the flexible tube 17 may be bent due to the upwards movement of the junction element 18, the vertical tubular member 19a and the injection member 22. Thereby however, residual liquid may be collected in such a bent portion when the beverage preparation is completed.

FIG. 4 relates to another state of the device according to FIGS. 1 to 3, in which the capsule is ejected from the brewing unit 4 into a provided space or waste container 35. For this reason, the device may comprise dedicated ejection means supporting the ejection of the capsule 20 from the brewing unit 4 in the correct direction towards such a container 35.

Also, as shown in FIG. 4 relating to the state after the beverage preparation, the injection member 22 is brought back into its retracted position either by a spring or mechanically such as to close-off the interior of the receptacle 1 into which the beverage 36 was provided.

At the same time, the junction element 18 is brought back into its lowered beverage ejection position as already described with reference to FIG. 1.

As a subsequent step, the locking means 12 may then be unlocked and the consumer is enabled to remove the receptacle 1 from the support means 11 of the device in order to enjoy the prepared beverage.

As further indicated in FIG. 4, the device 10 may be integrated in a kitchen worktop or other suitable furniture 37. Thereby, the receptacle support means 11 is (in a particular, non-limiting embodiment) arranged to protrude from an upper surface of such a kitchen furniture. The surface may further comprise an opening 37a corresponding to the insertion aperture 13 of the brewing unit 4 such that the provision of capsules thereto is enabled.

Although the presently disclosed and/or claimed inventive concept(s) has been described with reference to particular, non-limiting embodiments thereof, many modifications and alternations may be made by a person having ordinary skill in the art without departing from the scope of the presently disclosed and/or claimed inventive concept(s) which is defined by the appended claims. In particular, the disclosed receptacle may be of various different forms and/or sizes.

The invention claimed is:

1. A device for preparing a liquid comestible comprising:
   a beverage brewing unit for supply of a beverage prepared from ingredients contained within a capsule;
   a receptacle support designed to support and to selectively connect to a receptacle for receiving the resulting beverage, wherein the receptacle support comprises an outlet aperture;
   beverage delivery means adapted to collect and/or guide the resulting beverage from the beverage brewing unit to the receptacle support, the beverage delivery means formed of a flexible tube portion and a tubular member, wherein the flexible tube portion is connected to the beverage brewing unit, and the tubular member is arranged within the device in an essentially vertical direction and is connected to the outlet aperture of the receptacle support;
   a pump in fluid communication with the beverage delivery means; and
   an injection member supported within or connected to the tubular member of the beverage delivery means, the injection member being adapted to selectively open a portion of an outer wall of the receptacle connected to the receptacle support via the outlet aperture of the receptacle support for establishing a fluid communication between the beverage delivery means and the receptacle, the injection member being moveably arranged within the device in an essentially vertical direction between a retracted position in which the injection member does not protrude from the outlet aperture within the receptacle support and an extended beverage delivery position in which the injection member protrudes from the outlet aperture of the receptacle support to establish a fluid communication between the beverage delivery means and the receptacle;
   an ejection outlet; and
   a junction element connecting the beverage delivery means to the ejection outlet for selectively ejecting any residual liquid from the beverage delivery means, the junction element being moveably arranged within the device between a lowered beverage ejection position in which any residual liquid is ejected and an elevated beverage delivery position in which beverage is supplied to the receptacle, and wherein the junction element comprises an outlet aperture designed for being selectively closed in the beverage delivery position;
   wherein the junction element is connected to the injection member whereby movement of the junction element between the lowered beverage ejection position and the elevated beverage delivery position within the device also leads to a corresponding movement of the injection member between the retracted position and the extended beverage delivery position, whereby residual liquid is evacuated from the beverage delivery means when the injection member is positioned in the retracted position.

2. The device according to claim 1, wherein the beverage delivery means comprise at least one flexible tube member fluidically connecting an outlet of the beverage brewing unit with the junction member.

3. A device for preparing a liquid comestible comprising:
   a beverage brewing unit for supply of a beverage prepared from ingredients contained within a capsule;
   a receptacle support designed to support and to selectively connect to a receptacle for receiving the resulting beverage, wherein the receptacle support comprises an outlet aperture;
   beverage delivery means adapted to collect and/or guide the resulting beverage from the beverage brewing unit to the receptacle support, the beverage delivery means formed of a flexible tube portion and a tubular member, wherein the flexible tube portion is connected to the beverage brewing unit, and the tubular member is connected to the outlet aperture of the receptacle support;
   a pump in fluid communication with the beverage delivery means; and
   an injection member supported within or connected to the tubular member of the beverage delivery means, the injection member being adapted to selectively open a portion of an outer wall of the receptacle connected to the receptacle support via the outlet aperture of the receptacle support for establishing a fluid communication between the beverage delivery means and the receptacle, the injection member being moveably arranged within the device in an essentially vertical direction between a retracted position in which the injection member does not protrude from the outlet aperture within the receptacle support and an extended beverage delivery position in which the injection member protrudes from the outlet aperture of the receptacle support to establish a fluid communication between the beverage delivery means and the receptacle;
   an ejection outlet; and
   a junction element connecting the beverage delivery means to the ejection outlet for selectively ejecting any residual liquid from the beverage delivery means, the junction element being moveably arranged within the device between a lowered beverage ejection position in which any residual liquid is ejected and an elevated beverage delivery position in which beverage is supplied to the receptacle, and wherein the flexible tube portion of the beverage delivery means fluidically connects an outlet of the beverage brewing unit with the junction member; and wherein the junction element is connected to the injection member whereby movement of the junction element between the lowered beverage ejection position and the elevated beverage delivery position within the device also leads to a corresponding movement of the injection member between the retracted position and the extended beverage delivery position, whereby residual liquid is evacuated from the beverage delivery means when the injection member is positioned in the retracted position.

4. A device for preparing a beverage from ingredients contained in a capsule, the device comprising:

a brewing unit designed for receiving the capsule and preparing the beverage from the ingredients by injection of pressurized liquid into the capsule, a receptacle support designed to support and to selectively connect to a receptacle for receiving the resulting beverage, wherein the receptacle support comprises an outlet aperture, beverage delivery means adapted to collect and/or guide the resulting beverage from the brewing unit to the receptacle support, the beverage delivery means formed of a flexible tube portion and a tubular member, wherein the flexible tube portion is connected to the brewing unit, and the tubular member is connected to the outlet aperture of the receptacle support, an injection member supported within or connected to the tubular member of the beverage delivery means, the injection member being adapted to selectively open a portion of an outer wall of the receptacle connected to the receptacle support via the outlet aperture of the receptor support for establishing a fluid communication between the beverage delivery means and the receptacle, the injection member being moveably arranged within the device in an essentially vertical direction between a retracted position in which the injection member does not protrude from the outlet aperture within the receptacle support and an extended beverage delivery position in which the injection member protrudes from the outlet aperture of the receptacle support to establish a fluid communication between the beverage delivery means and the receptacle;

an ejection outlet; and a junction element connecting the beverage delivery means to the ejection outlet for evacuating residual liquid from the beverage delivery means, the junction element being moveably arranged within the device between a lowered beverage ejection position in which any residual liquid is ejected and an elevated beverage delivery position in which beverage is supplied to the receptacle; and wherein the junction element is connected to the injection member whereby movement of the junction element between the lowered beverage ejection position and the elevated beverage delivery position within the device also leads to a corresponding movement of the injection member between the retracted position and the extended beverage delivery position, whereby residual liquid is evacuated from the beverage delivery means when the injection member is positioned in the retracted position.

5. The device according to claim 4, wherein the injection member is arranged within a base portion of the receptacle support and is designed for connecting to a bottom portion of the receptacle.

6. The device according to claim 4, wherein the receptacle support is arranged at a vertical position of greater height than the brewing unit.

7. The device according to claim 4, wherein the brewing unit comprises at least one enclosing member designed for being transferred between an open insertion position for inserting the capsule and a closed injection position for enclosing the capsule within the brewing unit.

8. The device according to claim 4, wherein the device further comprises a support plate against which an outlet face of the capsule abuts in a closed injection position of the brewing unit, said support plate being movable into an open position allowing emptying of the beverage delivery means.

9. The device according to claim 8, wherein the support plate comprises opening means for opening the outlet face of the capsule upon provision of pressurized liquid to the capsule.

10. A method for preparing a beverage from ingredients contained within a capsule, the method comprising the steps of:

connecting a beverage receptacle to a support portion of the beverage preparation device of any one of claims 1-9, preparing a beverage by means of injection of pressurized liquid into a capsule, and supplying the resulting beverage into the receptacle through an outer wall of the receptacle.

11. The method according to claim 10, the method further comprising the step of evacuating residual liquid and/or beverage from the beverage delivery means of the device after and/or before the preparation of the beverage by means of injection of liquid into the capsule.

* * * * *